(12) United States Patent
Bredius

(10) Patent No.: US 10,856,695 B2
(45) Date of Patent: Dec. 8, 2020

(54) SELECTOR UNIT AND COFFEE MACHINE

(71) Applicant: KONINKLIJKE PHILIPS N.V., Eindhoven (NL)

(72) Inventor: Erik Paul Jozef Maria Bredius, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 198 days.

(21) Appl. No.: 15/747,783

(22) PCT Filed: Jul. 28, 2016

(86) PCT No.: PCT/EP2016/068092
§ 371 (c)(1),
(2) Date: Jan. 26, 2018

(87) PCT Pub. No.: WO2017/017231
PCT Pub. Date: Feb. 2, 2017

(65) Prior Publication Data
US 2018/0206676 A1    Jul. 26, 2018

(30) Foreign Application Priority Data

Jul. 30, 2015    (EP) ..................................... 15179089

(51) Int. Cl.
*A47J 42/50*    (2006.01)

(52) U.S. Cl.
CPC ..................................... *A47J 42/50* (2013.01)

(58) Field of Classification Search
CPC ...... A47J 31/007; A47J 31/3614; A47J 42/50; A47J 42/40; A47J 31/42; B02C 18/2291;
(Continued)

(56) References Cited

U.S. PATENT DOCUMENTS 4,789,106 A * 12/1988 Weber ..................... A47J 31/42
                                                            241/100
4,971,259 A    11/1990 Nidiffer
(Continued)

FOREIGN PATENT DOCUMENTS

CN    2730271 Y    10/2005
DE    509864 C * 10/1930 .............. A47J 42/50
(Continued)

OTHER PUBLICATIONS

"Collins English Dictionary", 2014, HarperCollins, 12th Edition, "Flap" (Year: 2014).*

Primary Examiner — Adam J Eiseman
Assistant Examiner — Dylan Schommer
(74) Attorney, Agent, or Firm — Schott, P.C.

(57) ABSTRACT

The present invention relates to a selector unit (10) for selectively feeding beans (20), in particular coffee beans, from a plurality of storage containers (16, 18) to an outlet opening (22). The selector unit comprises a shutter (26) associated to the outlet opening, wherein the shutter is movably mounted and movable in at least two different positions for feeding the beans from at least one selected storage container of the plurality of storage containers to the outlet opening. The selector unit further comprises a lever (30) including an actuation portion (36, 38) associated to the shutter for actuating the shutter in order to move the shutter in the at least two different positions, wherein the lever is formed separately from the shutter and movable with respect to the shutter.

20 Claims, 6 Drawing Sheets

(58) Field of Classification Search
CPC ...... B02C 18/2225; B02C 2013/28681; B02C 2013/28672; B02C 2013/28618; B02C 4/286; B02C 2/007; B02C 11/04; B02C 17/183
USPC .................. 222/144.5, 145.1, 145.4; 99/286
See application file for complete search history.

(56) References Cited

U.S. PATENT DOCUMENTS

| | | |
|---|---|---|
| 5,386,944 A | 2/1995 | Knepler et al. |
| 5,458,295 A | 10/1995 | Haber |
| 5,845,857 A | 12/1998 | Haber |
| 7,243,867 B2 * | 7/2007 | Steckhan ................ A47J 31/42 241/100 |
| 7,293,726 B2 | 11/2007 | Rohde |
| 9,848,736 B2 * | 12/2017 | Buffinga ............ B65D 83/0005 |
| 2005/0258287 A1 * | 11/2005 | Rohde ..................... A47J 42/50 241/100 |
| 2006/0201339 A1 | 9/2006 | Vetterli |

FOREIGN PATENT DOCUMENTS

| | | |
|---|---|---|
| DE | 509864 C | 10/1930 |
| DE | 572572 C | 3/1933 |
| DE | 202008001749 U1 | 4/2008 |
| DE | 102013224592 | 6/2015 |
| EP | 2087820 A1 | 8/2009 |
| JP | 2003063593 A * | 3/2003 |
| KR | 20090006365 A | 1/2009 |
| NL | 1028260 C2 | 8/2006 |
| WO | 2013056871 A1 | 4/2013 |
| WO | 2014181225 A | 11/2014 |

* cited by examiner

SELECTOR UNIT AND COFFEE MACHINE

This application is the U.S. National Phase application under 35 U.S.C. § 371 of International Application No. PCT/EP2016/068092, filed on Jul. 28, 2016, which claims the benefit of International Application No. 15179089.6 filed on Jul. 30, 2015. These applications are hereby incorporated by reference herein.

FIELD OF THE INVENTION

The present invention relates to a selector unit for selectively feeding beans, in particular coffee beans, from a plurality of storage containers to an outlet opening. The present invention further relates to a coffee machine including a plurality of storage containers for storing coffee beans.

BACKGROUND OF THE INVENTION

Coffee machines are often equipped with a plurality of storage containers for storing different kinds of coffee beans, wherein the coffee beans of the different containers can be fed selectively to a grinding mill in order to grind the different kinds of coffee beans selectively and to brew correspondingly different coffee beverages. A corresponding coffee machine including two storage containers and a selection mechanism for selectively feeding the beans from the different containers to a grinding mill is e.g. known from U.S. Pat. No. 5,458,295.

The selection mechanism usually comprises a shutter or a flap, which is movable in order to feed the beans from different containers to an outlet opening and which can be actuated by means of a handle fixedly connected to the shutter. The beans tend to cause a blockage for the shutter so that the shutter cannot be moved entirely in an end position to close one of the storage containers. In these blocking situations, the operating lever or handle for actuating the shutter cannot be switched in an end position corresponding to the blocked position of the shutter so that the operating handle or lever cannot indicate correctly which of the storage containers is selected for the coffee beverage to be brewed and the user is in doubt of the effectiveness of the selection and therewith also the quality feel of the machine.

SUMMARY OF THE INVENTION

It is an object of the present invention to provide an improved selector unit for selectively feeding beans, in particular coffee beans from a plurality of storage containers to an outlet opening, wherein the selected storage container from which the beans are fed to the outlet opening can be indicated correctly. It is further an object of the present invention to provide a corresponding coffee machine.

According to one aspect of the present invention, a selector unit for selectively feeding beans, in particular coffee beans, from a plurality of storage containers to an outlet opening is provided, comprising:

a shutter associated to the outlet opening, wherein the shutter is movably mounted and movable in at least two different positions for feeding the beans from at least one selected storage container of the plurality of storage containers to the outlet opening, and a lever including an actuation portion associated to the shutter for actuating the shutter in order to move the shutter in the at least two different positions, wherein the lever is formed separately from the shutter and movable with respect to the shutter.

According to another aspect of the present invention, a coffee machine is provided, comprising:

a plurality of storage containers for storing coffee beans, a grinding mill for grinding the coffee beans, and a selector unit according to the present invention for selectively feeding the coffee beans from the storage containers to the grinding mill.

Preferred embodiments of the invention are defined in the dependent claims.

The present invention is based on the idea to indicate a position of the shutter by means of the lever which actuates the shutter, wherein the lever can be moved in a selected position independently whether the shutter has reached its end position or whether a bean blocks the shutter and obstructs the shutter to be moved in the end position. This is achieved according to the present invention by the lever being formed separately from the shutter and being movable with respect to the shutter. The separately formed lever can initially actuate the shutter in order to move the shutter to a closing position for closing a deselected storage container and the lever can be moved independently from the shutter to the desired and selected position. Since the lever is formed separately from the shutter and is movable with respect to the shutter, the actual end position of the shutter does not influence the position of the lever even if the shutter is blocked by a bean. Hence, the lever can be moved in the selected position independently whether the shutter is moved in the selected end position or whether the shutter cannot be entirely moved in the respective end position due to a bean blockage.

Hence, the selected storage container from which the beans are fed to the outlet opening can be indicated to the user correctly in any case by means of the lever or a handle connected to the lever.

In a preferred embodiment, the lever is movable independently from the shutter. This makes it possible to move the lever to a desired end position independently from the position of the shutter.

In a preferred embodiment, the shutter comprises a cam-follower engaged with a shutter cam portion for moving the shutter in the different positions. This makes it possible to move and latch the shutter reliable in the selected position.

In a preferred embodiment, the cam-follower comprises a spring element for preloading the cam-follower to the cam portion. This makes it possible to apply a force to the shutter in order to move the shutter separately from the lever precisely in the selected position of the at least two different positions.

In a preferred embodiment, the shutter is formed as a flap disposed at least partially between the storage containers. This makes it possible to feed the beans from the storage containers to the outlet opening by means of their own weight.

It is further preferred that the flap is pivotably mounted around a flap pivot-axis. This makes it possible to select the different storage containers and to feed the beans from the different storage containers to the outlet opening with low technical effort.

In a further preferred embodiment, the lever is pivotably mounted around a lever pivot-axis. This makes it possible to mount the lever with low technical effort.

In a further preferred embodiment, the flap pivot-axis and the lever pivot-axis are disposed parallel to each other. This makes it possible to actuate the shutter by means of the lever with low technical effort.

In a further preferred embodiment, the lever comprises two actuation portions each forming a stop for the shutter, wherein a free travel is formed between the actuation portions and the shutter. This makes it possible to actuate the shutter initially by means of the lever and to move the shutter further independently from the lever to its end position so that a bean blocking the shutter does not influence the end position of the lever.

In a preferred embodiment, the shutter comprises a recess or an opening, wherein an actuation arm of the lever is fed through the recess or the opening and the actuation portions formed at the actuation arm are disposed at opposite sides of the shutter. This makes it possible to push and pull the shutter by means of the lever and to move the shutter to an end position independently of the lever with low technical effort.

In a further preferred embodiment, the actuation portions are facing each other. This makes it possible to actuate the shutter in different opposing positions with low technical effort.

In a further preferred embodiment, the lever is engaged with a lever cam portion for moving the lever in a plurality of different lever positions corresponding to the different positions of the shutter. This makes it possible to indicate a selected shutter position correctly by means of the lever independently whether the shutter has reached its end position.

It is further preferred that the lever cam portion is formed at a pivotably or movably mounted cam element comprising a spring element for preloading the lever cam portion to the lever. This makes it possible to define different lever positions with low technical effort.

In a further preferred embodiment, the lever comprises a handle portion for actuating the lever, wherein the lever is movable in a slit of a slit element disposed between the handle portion and the lever cam portion. This makes it possible to protect the lever cam element from the outside and to mount the lever movable from the outside with low technical effort.

In a further preferred embodiment, the shutter cam portion comprises three cams forming two outer positions and a middle position for the shutter. This makes it possible to provide a position of the shutter for feeding the beans from two of the different storage containers simultaneously to the outlet opening.

As mentioned above, since the lever is formed separately from the shutter and movably mounted with respect to the shutter, the lever or an indicating portion connected to the lever can indicate a selected position of the shutter and a selected storage container from which the beans are fed to the outlet opening even though the shutter is blocked by a bean and cannot be fully movable in the selected position. Hence, a bean blockage can be compensated and the effectiveness of the selected storage container from which the beans are fed to the outlet opening can be indicated correctly so that the user is not in doubt about the effectiveness of the storage container selection.

BRIEF DESCRIPTION OF THE DRAWINGS

These and other aspects of the invention will be apparent from and elucidated with reference to the embodiments) described hereinafter. In the following drawings

DETAILED DESCRIPTION OF THE INVENTION

Figure 1:
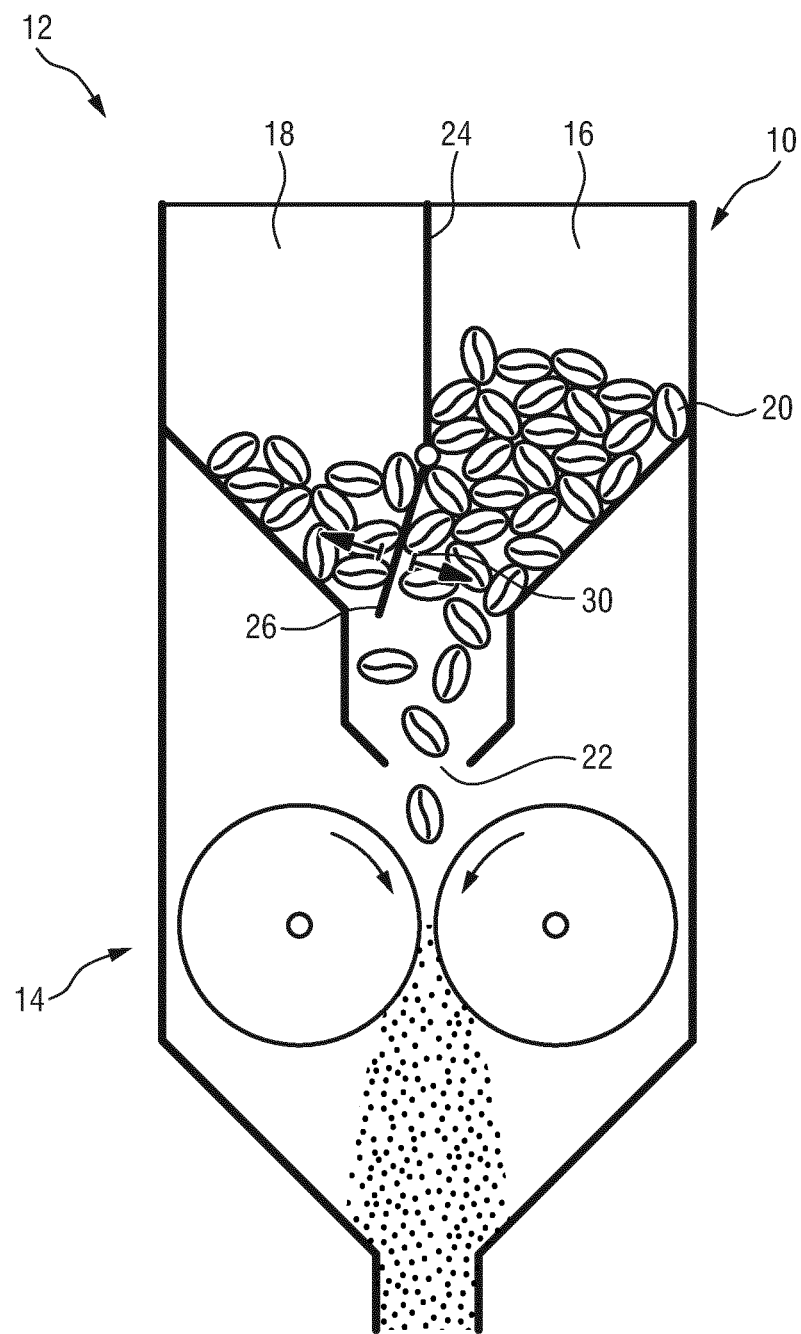
FIG. 1 shows a schematic illustration of a selector unit and a grinding mill of a coffee machine.

FIG. 1 shows a schematic sectional view of a selector unit which is generally denoted by 10. The selector unit 10 is part of a coffee machine 12 which includes a grinding mill 14 and two storage containers 16, 18 for storing coffee beans 20 to be fed to the grinding mill 14. The storage containers 16, 18 are disposed above the grinding mill 14 so that the coffee beans 20 can slip by means of their weight through an outlet opening 22 to the grinding mill 14, wherein the grinded coffee is fed to a beverage production unit (not shown) in order to produce a coffee beverage.

The storage containers 16, 18 are separated by a vertical separating wall 24. The selector unit 10 comprises a movable shutter 26 disposed between the separating wall 24 and the outlet opening 22. The shutter 26 is movably mounted in order to close or open the storage containers 16, 18 alternatively or selectively so that the beans 20 of one of the storage containers 16, 18 can be fed to the outlet opening 22 and to the grinding mill 14, respectively. Hence, different kinds of coffee beans stored in the storage containers 16, 18 can be selected to produce the coffee beverage. The shutter 26 is formed as a pivotable flap, which closes one of the storage containers 16, 18 and at the same time opens the respective other storage container 16, 18 in two different end positions. In a middle position, the shutter 26 opens both storage containers 16, 18 to the outlet opening 22 so that the coffee beans 20 from both storage containers 16, 18 are fed through the outlet opening 22 to the grind mill 14.

The shutter 26 is movable to the different positions by means of an actuation lever 30, which also indicates the position of the shutter 26 and the respectively selected storage container 16, 18 from which the beans 20 are fed to the grinding mill 14. The actuation lever 30 is formed separately from the shutter 26 as schematically shown in FIG. 1 and movable with respect to the shutter 26 as described in detail in the following.

Figure 2:
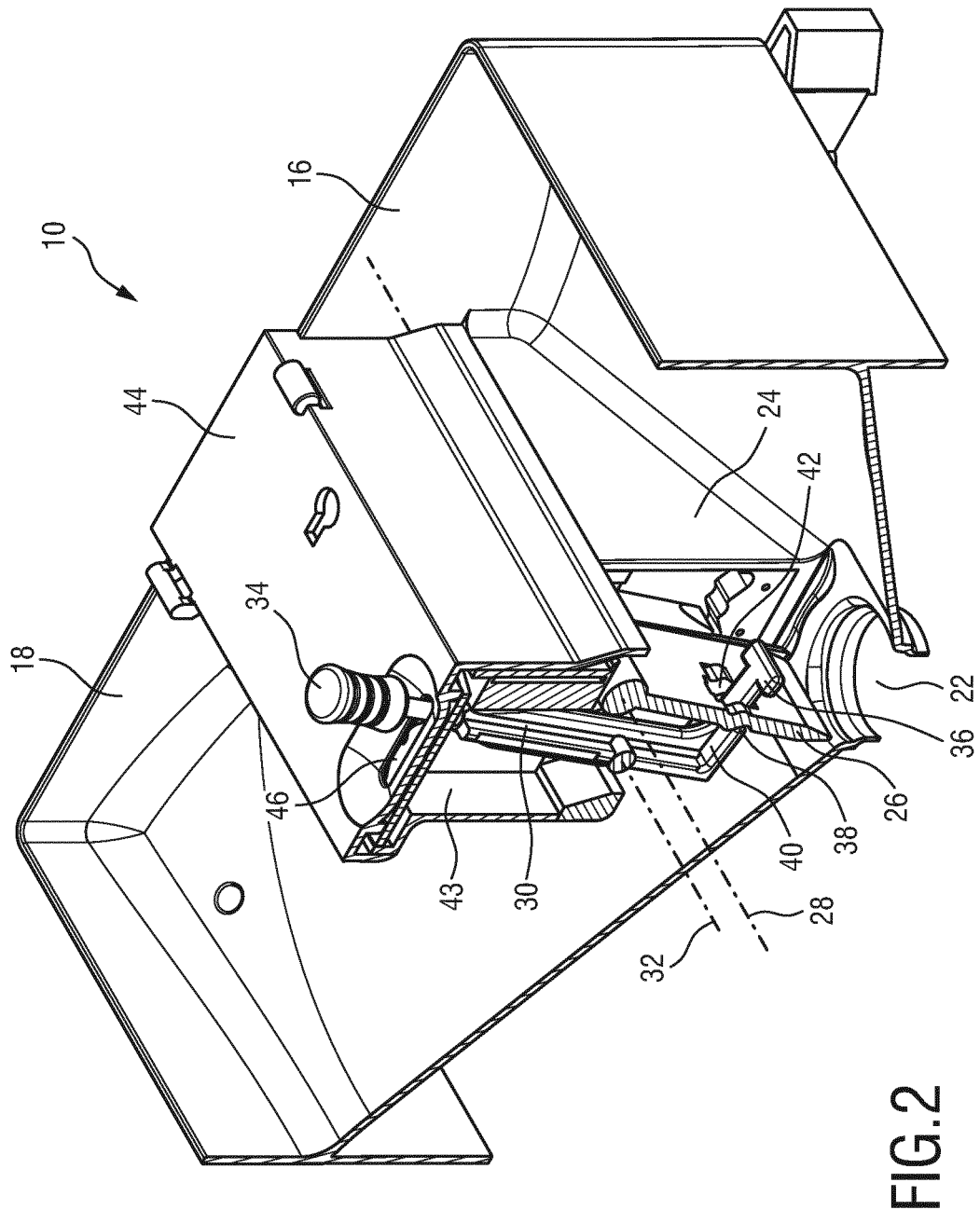
FIG. 2 shows a perspective sectional view of a selector unit for feeding beans from two different storage containers to an outlet opening.

FIG. 2 shows a perspective sectional view of the selector unit 10 and the storage containers 16, 18 for selectively feeding the beans 20 to the outlet opening 22. The shutter 26 is formed as a pivotable flap, which is pivotably mounted at a top end thereof around a flap pivot-axis 28 in order to move the shutter 26 in different positions and to close and open the storage container 16, 18 as mentioned above. The selector unit 10 comprises the actuation lever 30, which is pivotably mounted around a lever pivot-axis 32. The actuation lever 30 is formed separately from the shutter 26 and is in general movable with respect to the shutter 26. The actuation lever 30 comprises a handle portion 34 for actuating the actuation lever 30 and the shutter 26 from the outside. The actuation lever 30 comprises two actuation portions 36, 38 which are formed at a crank arm 40 of the actuation lever 30, wherein the crank arm 40 is fed through an opening 42 of the shutter 26 so that the actuation portions 36, 38 are disposed on opposite sides of the shutter 26. The actuation portions 36, 38 form opposite stops for the shutter 26, wherein the actuation portions 36, 38 have a distance to each other so that the shutter 26 is movable between the actuation portions 36, 38.

The shutter 26 and the actuation lever 30 are each associated to a separate cam portion in order to move the actuation lever 30 and the shutter 26 independently in predefined positions as described in the following.

By means of the actuation portions 36, 38, the shutter 26 can be initially pushed or pulled from one position in a direction of another position in order to open and close the storage container 16, 18. The actuation lever 30 can be moved in a predefined position by means of the handle portion 34, wherein the so actuated or initially pushed or pulled shutter 26 is moved further independently from the actuation lever 30 towards its end position by means of the respective cam portion. Hence, the position of the handle portion 34 indicates the selected storage container 16, 18 correctly and independently whether the shutter 26 has reached its end position. Hence, even if the shutter 26 is not fully moved in a predefined end position due to a bean blockage, the handle portion 34 indicates the selected position correctly so that the user is not in doubt of the selected storage container 16, 18 to be used for producing the coffee. The bean flow of the unselected storage container 16, 18 is in any case interrupted even if a bean blocks the shutter 26 so that the functionality of the shutter 26 is ensured in any case. The geometry of the lever 30 is made in such way that the lever 30 always moves to its desired position, independent of the sometimes obstructed movement of the shutter 26.

The selector unit 10 further comprises a housing 43 in which the lever 30 and the shutter 26 are accommodated and a cover 44 comprising a slit 46 through which the actuation lever 30 is fed and in which the actuation lever 30 is movably mounted. The handle portion 34 is disposed on the outside of the cover 44 so that the handle portion 34 can be actuated by the user and the respective position of the handle portion 34 can indicate the selected storage container 16, 18. The cover 44 serves to protect the selector unit 10 from the outside e.g. against dust or the like.

Figure 3:
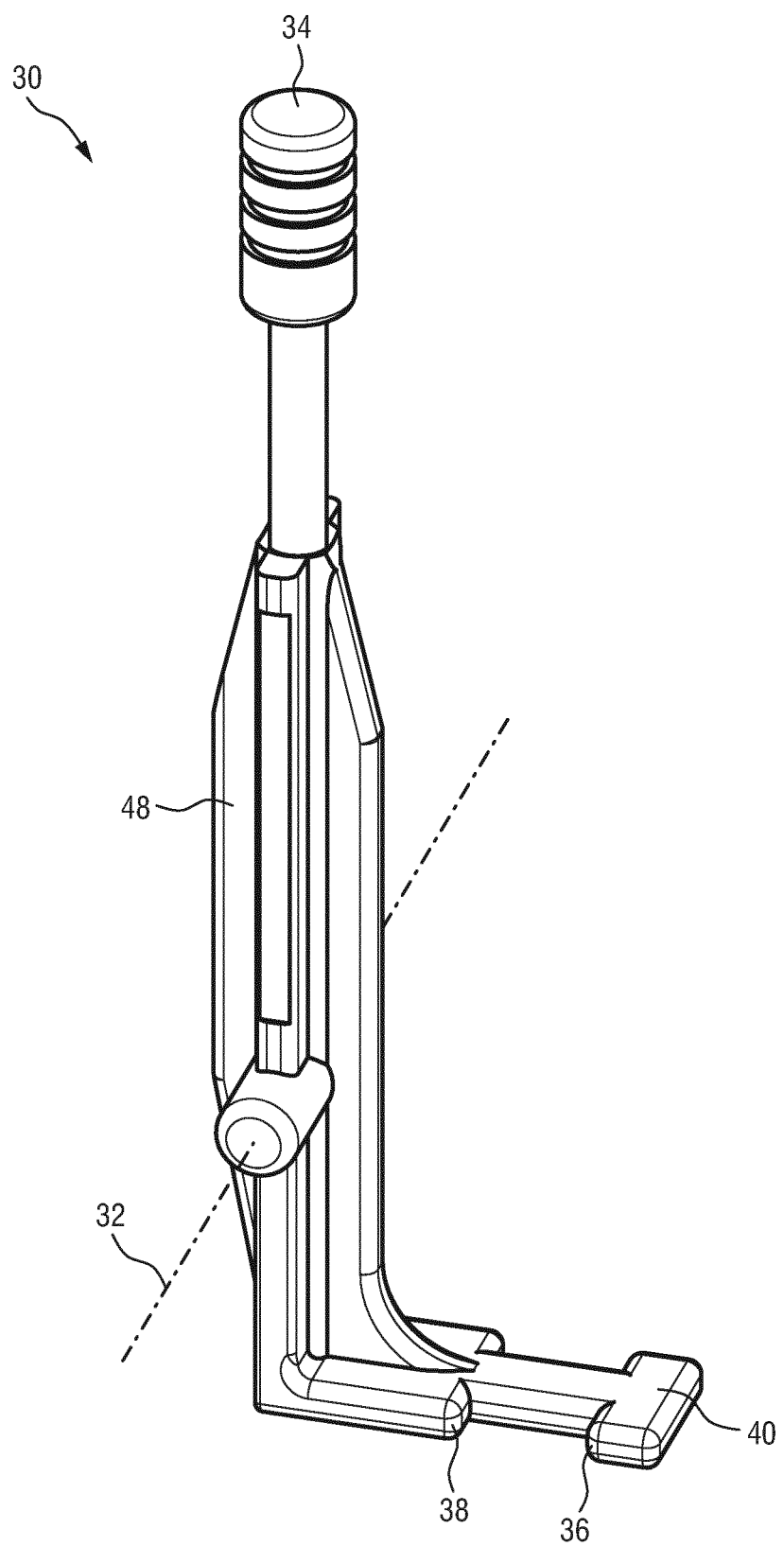
FIG. 3 shows a perspective view of a lever for actuating a shutter of the selector unit.

FIG. 3 shows a perspective view of the actuation lever 30. Identical elements are denoted by identical reference numerals.

The actuation lever 30 is pivotably mounted around the lever pivot-axis 32 and comprises an elongated main body 48, wherein the crank arm 40 extends at one end of the main body 48 orthogonally to the elongated main body 48. The handle portion 34 is formed at an end of the main body 48 opposite to the crank arm 40 so that a pivoting of the actuation lever 30 around the lever pivot-axis 32 moves the crank arm 40 including the actuation portions 36, 38 in a longitudinal direction of the crank arm 40.

The actuation portions 36, 38 are formed at the crank arm 40 by two recesses at both sides of the crank arm 40 so that the actuation portions 36, 38 are formed in the longitudinal direction opposite to each other and facing each other. The actuation portions 36, 38 can push and pull the shutter 26 in the longitudinal direction of the crank arm 40. The crank arm 40 including the actuation portions 36, 38 is fed through the opening 42 of the shutter 26, wherein the actuation portions 36, 38 have a distance to each other so that the free travel or an idle travel or a slack is formed for the shutter 26.

Figure 4:
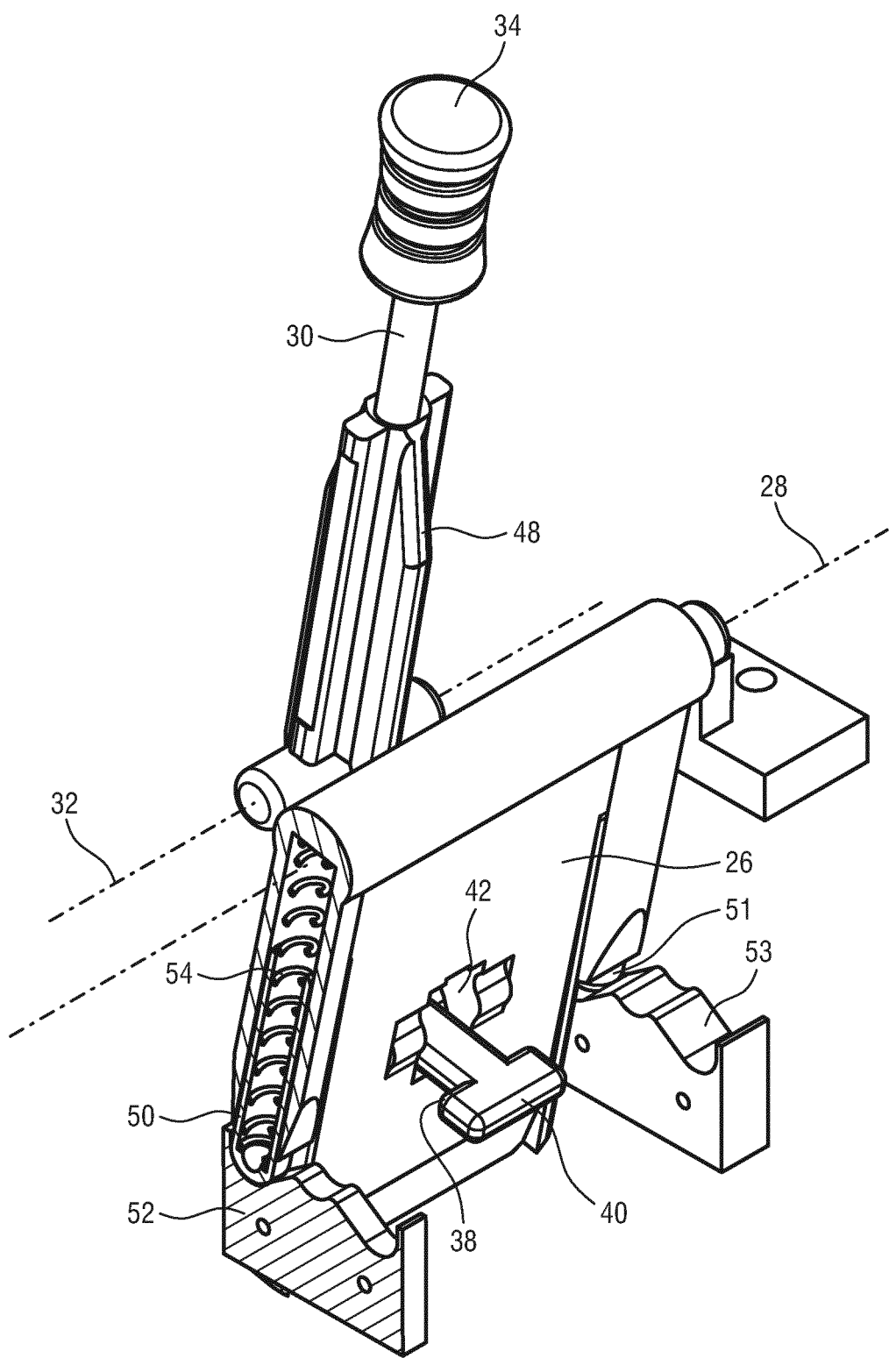
FIG. 4 shows a perspective sectional view of the shutter of the selector unit.

FIG. 4 shows a perspective sectional view of the shutter 26. Identical elements are denoted by identical reference numerals, wherein here merely the differences are explained in detail.

The shutter 26 comprises two cam follower 50, 51 at opposite sides of its main body, wherein the cam followers 50, 51 are each engaged with one cam portion 52, 53 in order to fix the shutter 26 in different predefined positions in which one or both of the storage containers 16, 18 are selected to feed the beans 20 to the outlet opening 22. The cam follower 50, 51 each comprise a spring 54 which preloads the cam follower 50, 51 and forces the cam follower 50, 51 to the cam portion 52, 53. By means of the spring 54, the shutter 26 is moved actively along the cam portion 52, 53 to the predefined positions. Hence, the shutter 26 is moved by the spring-loaded cam follower 50, 51 if the shutter 26 is initially actuated by the actuation lever 30 and moved above a peak of the cam portion 52, 53. The cam follower 50, 51 and the spring 54 are each disposed in an empty hole formed in the main body of the shutter 26 perpendicular to the flap pivot-axis 28, wherein a tip of each of the cam follower 50, 51 extends out of the respective empty hole in order to engage with the cam portions 52, 53.

The opening 42 in the main body of the shutter 26 has an elongated shape so that a T-shaped tip of the crank arm 40 which comprises the actuation portion 38 can be guided through the opening 42 by twisting the actuation lever 30 by 90° around a longitudinal axis of the crank arm 40. The actuation portions 36, 38 can be engaged with the main body of the shutter 26 when the actuation lever 30 is twisted backward in the upward position as shown in FIG. 4.

The cam portion 52, 53 comprises three cam positions formed as indentations, wherein the two outer cam positions form a position to close one of the storage containers 16, 18 and the middle cam position forms a position for the shutter 26 in which the beans 20 from both storage containers 16, 18 can be fed through the outlet opening 22.

Figure 5:
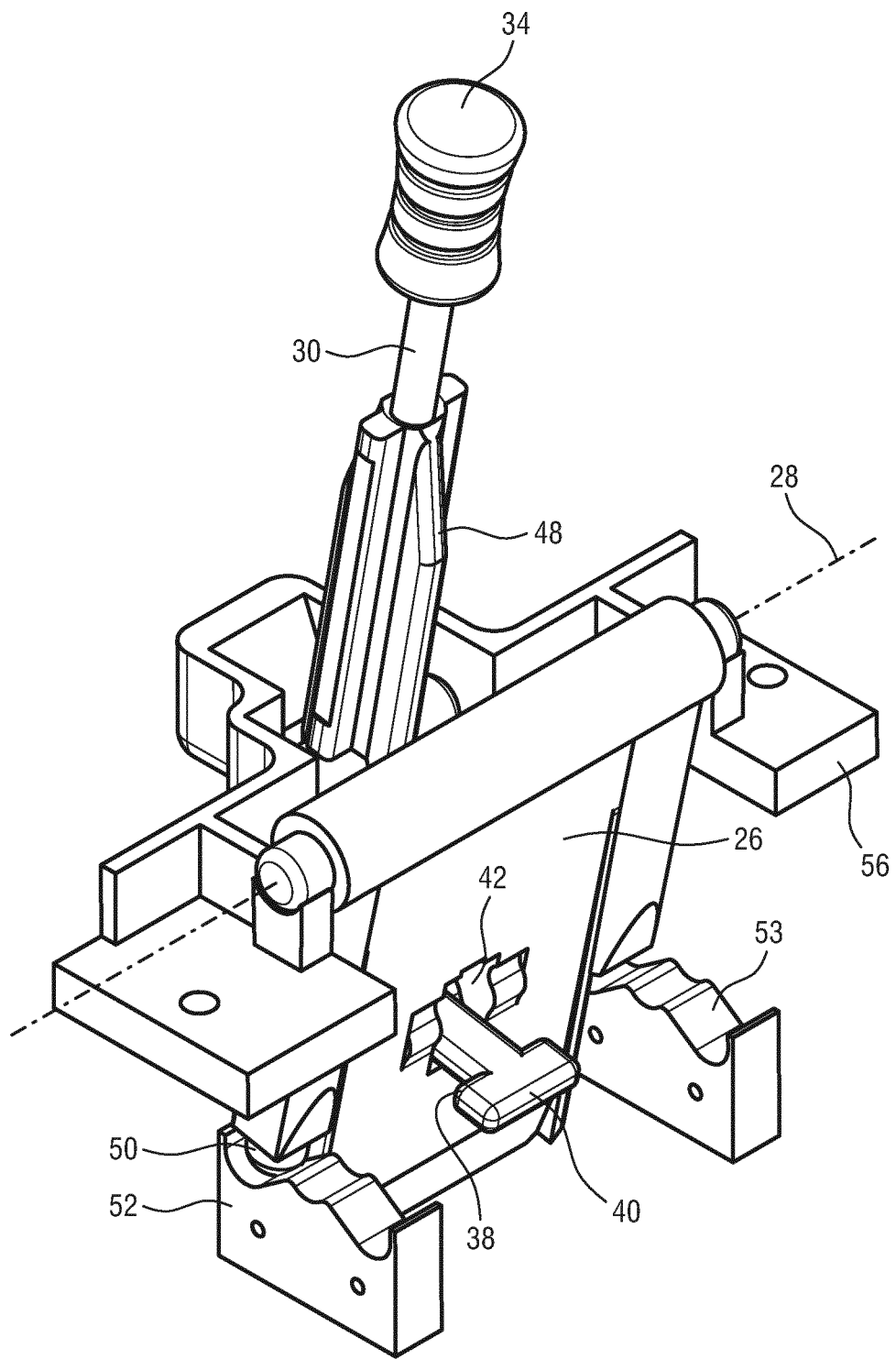
FIG. 5 shows a perspective view of the selector unit.

FIG. 5 shows an assembly drawing of the shutter 26, the actuation lever 30, the cam portions 52, 53 and a bearing device 56 for pivotably mounting the shutter 26 and the actuation lever 30. The shutter 26 is pivotably mounted around the flap pivot-axis 28 and the actuation lever 30 is pivotably mounted around the lever pivot-axis 32. The flap pivot-axis 28 and the lever pivot-axis 32 are arranged parallel to each other so that the shutter 26 can be actuated or moved around the flap pivot-axis 28 by means of the actuation lever 30.

The crank arm 40 including the actuation portions 36, 38 is fed through the opening 42 of the shutter 26, wherein the actuation portions 36, 38 have a distance to each other so that the free travel is formed for the shutter 26. The shutter 26 is therefore movable between the actuation portions 36, 38, so that the actuation lever 30 can be moved in a desired or selected position even if the shutter 26 cannot be moved to an end position due to a bean blockage.

Figure 6:
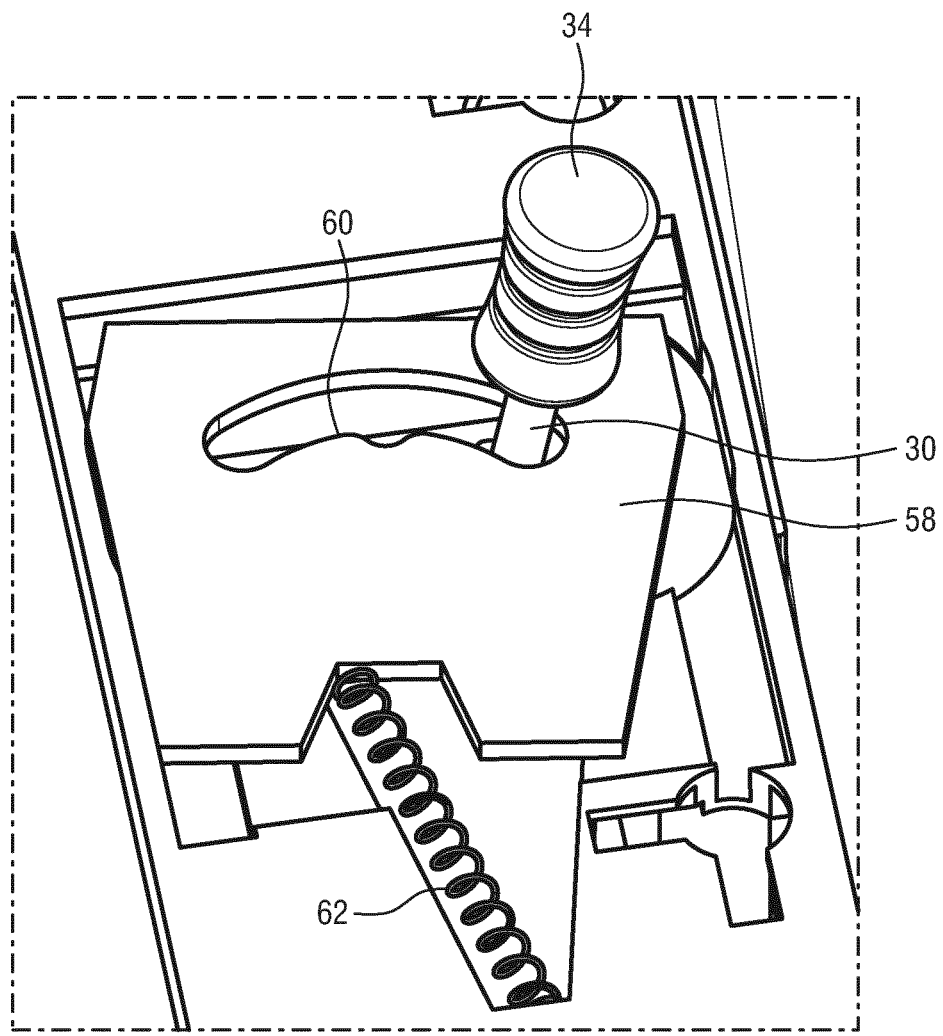
FIG. 6 shows a perspective view of a handle and a cam element of the selector unit.

FIG. 6 shows a perspective view of a cam element 58 associated to the actuation lever 30 for fixing the actuation lever 30 in predefined positions. The cam element 58 comprises a cam portion 60 associated to the actuation lever 30 between the handle portion 34 and the main body 48. The cam element 58 is movable mounted between the housing 43 of the selector unit 10 and the cover 44 and preloaded by means of a spring 62 so that the cam portion 60 is forced to the actuation lever 30.

The cam portion 60 comprises a plurality of cams corresponding to the cams of the cam portions 52, 53 so that the actuation lever 30 and the handle portion 34 are forced and fixed in predefined positions corresponding to a desired position of the shutter 26 to select one or two of the storage containers 16, 18 for providing the beans 20 to the grinding mill 14. Since the actuation lever 30 and the shutter 26 each comprises a cam portion 52, 53, 60 and are movable with respect to each other within the range of the distance of the actuation portions 36, 38 or the free travel between the actuation portions 36, 38 and the shutter 26, the handle portion 34 can indicate a selected position even if a bean blocks the shutter 26 and obstructs the shutter 26 to be moved in the predefined end position.

The cam element 58 is in this particular embodiment pivotable around an axis perpendicular to the lever pivot-axis 32 to seal or close the slit 46, however, the cam element 58 may also be slidable in order to preload the cam portions 60 against the actuation lever 30.

Due to the preloading of the cam element 60 by means of the spring 62, the actuation lever 30 jumps into a predefined position when the handle portion 34 is pushed or pulled more than half way of its stroke. The cam portion 60 defines three different positions for the actuation lever 30 corresponding to the positions of the shutter 26 defined by the cam portion 52, 53, wherein the cam portion 60 forms two end positions and one middle position.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

Any reference signs in the claims should not be construed as limiting the scope.

The invention claimed is:

1. A selector unit for selectively feeding beans, in particular coffee beans, from a plurality of storage containers to an outlet opening, the selector unit comprising:
   a shutter associated to the outlet opening, wherein the shutter is movably mounted and movable in at least two different positions for feeding the beans from at least one selected storage container of the plurality of storage containers to the outlet opening; and
   a lever including an actuation portion associated to the shutter for actuating the shutter in order to move the shutter in the at least two different positions, wherein the lever is formed separately from the shutter and movable with respect to the shutter, wherein the lever is movable independently from the shutter, and wherein the lever is engaged with a lever cam-portion for moving the lever in a plurality of different lever positions corresponding to the at least two different positions of the shutter.

2. The selector unit as claimed in claim 1, wherein the shutter comprises a cam-follower engaged with a shutter cam portion for moving the shutter in the at least two different positions.

3. The selector unit as claimed in claim 2, wherein the cam-follower comprises a spring element for preloading the cam-follower to the shutter cam portion.

4. The selector unit as claimed in claim 1, wherein the shutter is formed as a flap disposed at least partially between the plurality of storage containers.

5. The selector unit as claimed in claim 4, wherein the flap is pivotably mounted around a flap pivot-axis.

6. The selector unit as claimed in claim 5, wherein the lever is pivotably mounted around a lever pivot-axis.

7. The selector unit as claimed in claim 6, wherein the flap pivot-axis and the lever pivot-axis are disposed parallel to each other.

8. The selector unit as claimed in claim 1, wherein the lever comprises two actuation portions each forming a stop for the shutter, wherein a free travel is formed between the two actuation portions and the shutter, and wherein the two actuation portions comprises the actuation portion associated to the shutter.

9. The selector unit as claimed in claim 8, wherein the shutter comprises a recess, and wherein an actuation arm of the lever is fed through the recess and the two actuation portions formed at the actuation arm are disposed at opposite sides of the shutter.

10. The selector unit as claimed in claim 9, wherein the two actuation portions are facing each other.

11. The selector unit as claimed in claim 1, wherein the lever cam-portion is formed at a movable mounted cam element comprising a spring element for preloading the lever cam-portion to the lever.

12. The selector unit as claimed in claim 11, wherein the lever comprises a handle portion for actuating the lever, and wherein the lever is movable in a slit of a slit element disposed between the handle portion and the lever cam-portion.

13. The selector unit as claimed in claim 2, wherein the shutter cam portion comprises three cams positions forming two outer positions and a middle position for the shutter.

14. A coffee machine, comprising:
   a plurality of storage containers for storing coffee beans,
   a grinding mill for grinding the coffee beans, and
   a selector unit as claimed in claim 1 for selectively feeding the coffee beans from the plurality of storage containers to the grinding mill.

15. A selector unit for selectively feeding beans, in particular coffee beans, from a plurality of storage containers to an outlet opening, the selector unit comprising:
   a shutter associated to the outlet opening, wherein the shutter is movably mounted and movable in at least two different positions for feeding the beans from at least one selected storage container of the plurality of storage containers to the outlet opening, and
   a lever for actuating the shutter in order to move the shutter in the at least two different positions, wherein the lever is movable independently from the shutter, wherein the lever comprises two actuation portions which are formed at an actuation arm of the lever, and wherein the actuation arm is fed through a recess of the shutter.

16. The selector unit as claimed in claim 15, wherein the two actuation portions are associated to the shutter, and wherein the shutter is movable between the two actuation portions.

17. The selector unit as claimed in claim 15, wherein the lever is formed separately from the shutter and movable with respect to the shutter.

18. A selector unit for selectively feeding beans, in particular coffee beans, from a plurality of storage containers to an outlet opening, the selector unit comprising:
   a shutter associated to the outlet opening, wherein the shutter is movably mounted and movable in at least two different positions for feeding the beans from at least one selected storage container of the plurality of storage containers to the outlet opening, and wherein the shutter comprises a cam-follower engaged with a shutter cam portion for moving the shutter in the at least two different positions; and a lever including an actuation portion associated to the shutter for actuating the shutter in order to move the shutter in the at least two different positions.

19. The selector unit as claimed in claim 18, wherein the cam-follower comprises a spring element for preloading the cam-follower to the shutter cam portion.

20. The selector unit as claimed in claim 18, wherein the shutter cam portion comprises three cams positions forming two outer positions and a middle position for the shutter.

* * * * *